(12) United States Patent
Shattuck et al.

(10) Patent No.: US 6,561,945 B2
(45) Date of Patent: May 13, 2003

(54) LAMINATED CARRIER ASSEMBLY

(75) Inventors: Charles W. Shattuck, West Goshen, CT (US); Christopher Kaswer, Avon, CT (US); Phillip J. Draper, Burlington, CT (US); Mitchell Bussell, New Hartford, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/884,521

(22) Filed: Jun. 19, 2001

(65) Prior Publication Data

US 2002/0022545 A1 Feb. 21, 2002

Related U.S. Application Data

(60) Provisional application No. 60/212,270, filed on Jun. 19, 2000.

(51) Int. Cl.$^7$ ................................................ F16H 57/08
(52) U.S. Cl. ...................... 475/331; 29/893; 29/893.37; 74/445
(58) Field of Search ........................... 475/331, 344; 74/445; 29/893, 893.3, 893.37, 434

(56) References Cited

U.S. PATENT DOCUMENTS

| | | | |
|---|---|---|---|
| 1,481,212 A | 1/1924 | Keller | |
| 3,719,103 A | 3/1973 | Streander | 74/445 |
| 3,842,481 A | 10/1974 | Laing | 29/434 |
| 3,999,445 A | * 12/1976 | Liautaud | 29/893.3 |
| 4,161,861 A | 7/1979 | Storm | 57/22 |
| 4,522,080 A | 6/1985 | Santi | 74/445 |
| 4,719,682 A | 1/1988 | Santi | 29/159.2 |
| 5,085,009 A | * 2/1992 | Kinumura et al. | 451/283 |
| 5,337,626 A | 8/1994 | Everts et al. | 74/445 |
| 5,497,548 A | * 3/1996 | Schlenger et al. | 242/430 |
| 5,593,360 A | 1/1997 | Ishida et al. | |
| 5,730,244 A | 3/1998 | Engler et al. | 180/417 |

FOREIGN PATENT DOCUMENTS

| | | | | |
|---|---|---|---|---|
| JP | 56164276 | * | 12/1981 | ............ 29/893.37 |
| JP | 63021135 | * | 1/1988 | ............ 29/893.37 |
| JP | 2002031259 | * | 1/2002 | |
| WO | WO 01/44695 | | 6/2001 | |

* cited by examiner

Primary Examiner—Sherry Estremsky
Assistant Examiner—Tisha D. Lewis
(74) Attorney, Agent, or Firm—Michael Best & Friedrich LLP

(57) ABSTRACT

A laminated carrier comprises a first end plate, a second end plate, and a connection joining the first and second end plates together such that windows are formed therebetween for locating planetary gears. At least one of the first and second end plates comprises multiple layers of material joined together, such that a non-uniform internal structure is formed.

16 Claims, 8 Drawing Sheets ion No. 60/212,270 filed Jun. 19, 2000.

LAMINATED CARRIER ASSEMBLY

This application claims the benefit of Provisional Application No. 60/212,270 filed Jun. 19, 2000.

BACKGROUND OF THE INVENTION

This invention relates generally to carrier members in which planet gears are mounted, and, more particularly, to carrier members as used in automatic, planetary transmissions or similar gear sets, for example.

Typically, carrier members are manufactured from castings or stampings. The carrier member is the structural member in which planet gears are mounted.

A carrier member that is made as a casting is illustrated as carrier member 10 in FIG. 1. Planetary gears 12 are mounted within windows 14 of carrier member 10 by planet shafts 16 and rollers 18, to provide free rotation about the planet shafts. Alternatively, the windows of the carrier member have been made by riveting two stamped end plates together, separated by spacers. The carrier member often requires subsequent manufacturing operations to prepare it for assembly with other components to produce a carrier assembly, which is a major subcomponent of the gear set. These subsequent operations might include the forming and/or drilling of lubrication access holes or the machining of surfaces, which interface with other components.

Such planetary gear sets often require additional components to ensure sufficient lubrication and prevent excessive wear. For example, elaborate arrangements may be required to catch and channel oil, and numerous washers may be required between the various moving parts to reduce wear. These components complicate assembly of the planetary gear sets and add to the cost.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a laminated carrier for a planetary gear set, the laminated carrier comprising a first end plate, a second end plate, and connecting means joining the first and second end plates together such that windows are formed therebetween for locating planetary gears. At least one of the first and second end plates comprises multiple layers of material joined together, such that a non-uniform internal structure is formed.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

This invention is directed to a carrier member for a planetary carrier wherein a principle structural component comprises multiple layers of material fastened together to form a laminated structure.

Significantly, the individual layers, typically stamped from strip, raw material, can have features formed into them as part of the stamping process, thus minimizing secondary operations. Additionally, the number, thickness, strength, configuration or material used in the individual layers can optimize the design of the carrier member for intended applications. The combination of these design variables allows the designer to accommodate the structural loads incurred during operation of the carrier assembly.

Figure 1:
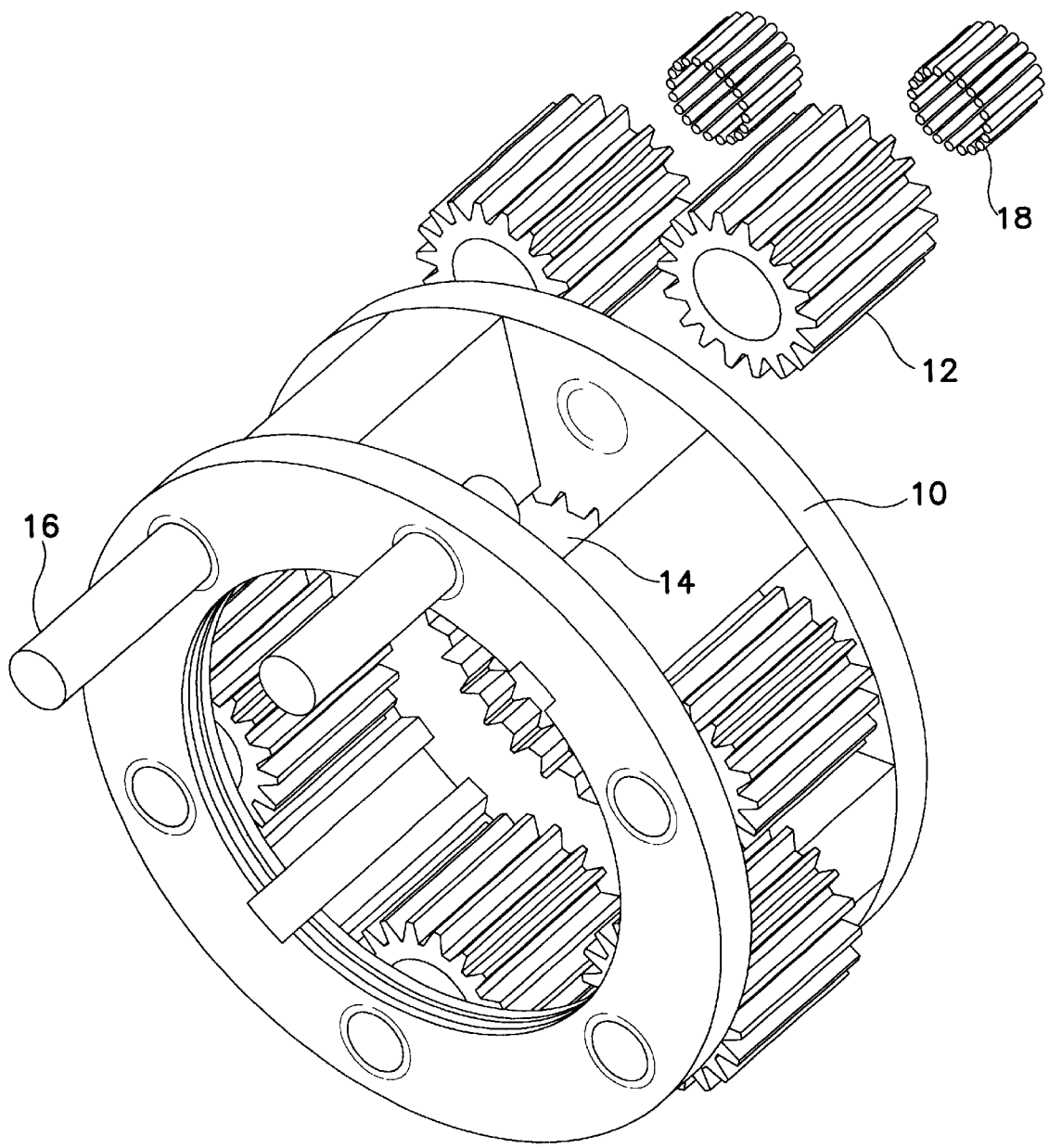
FIG. 1 is an exploded pictorial view of a carrier assembly illustrating the prior art.
Figure 2:
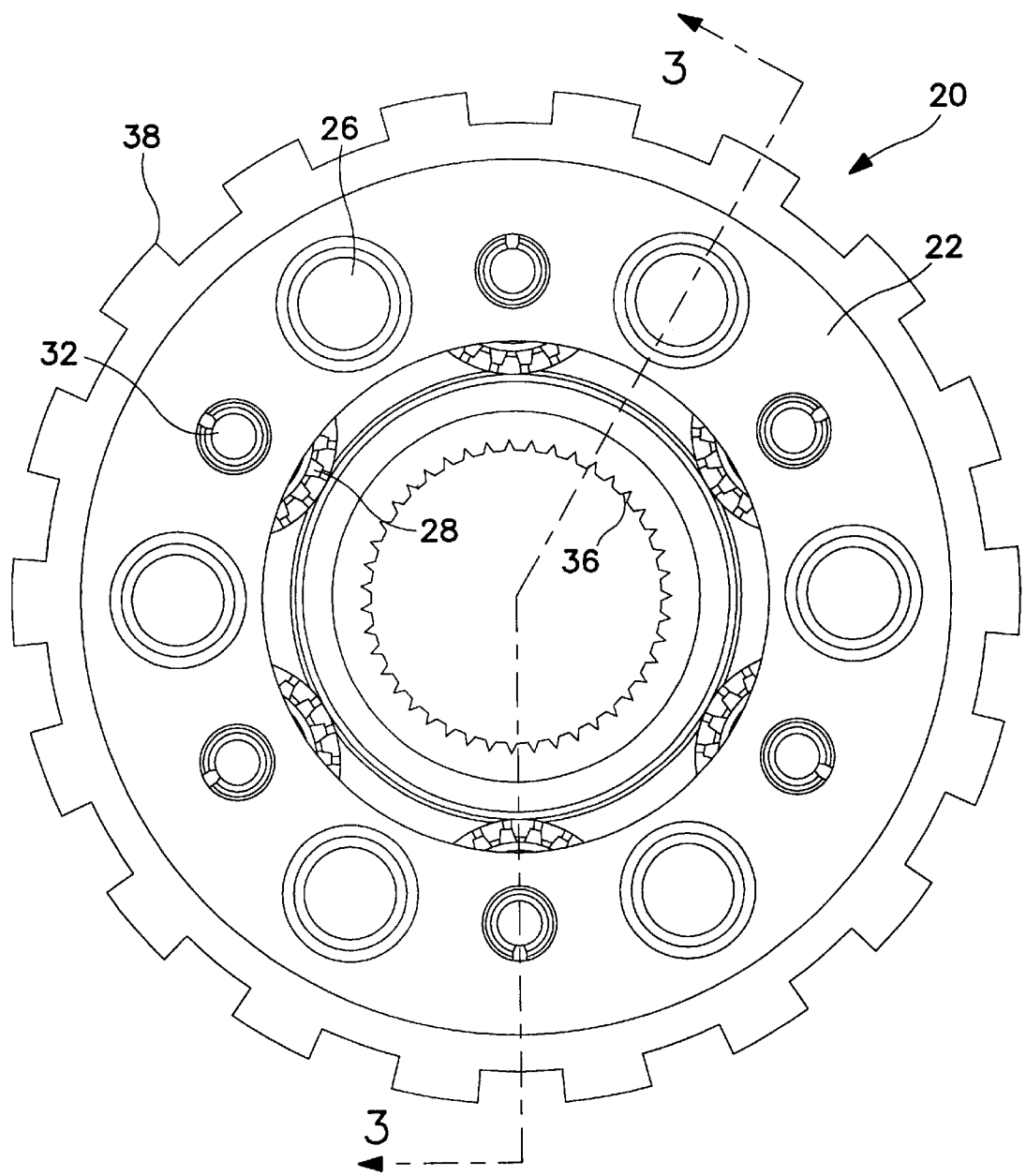
FIG. 2 is an end view of carrier assembly illustrating an embodiment of the laminated carrier of the present invention.
Figure 3:
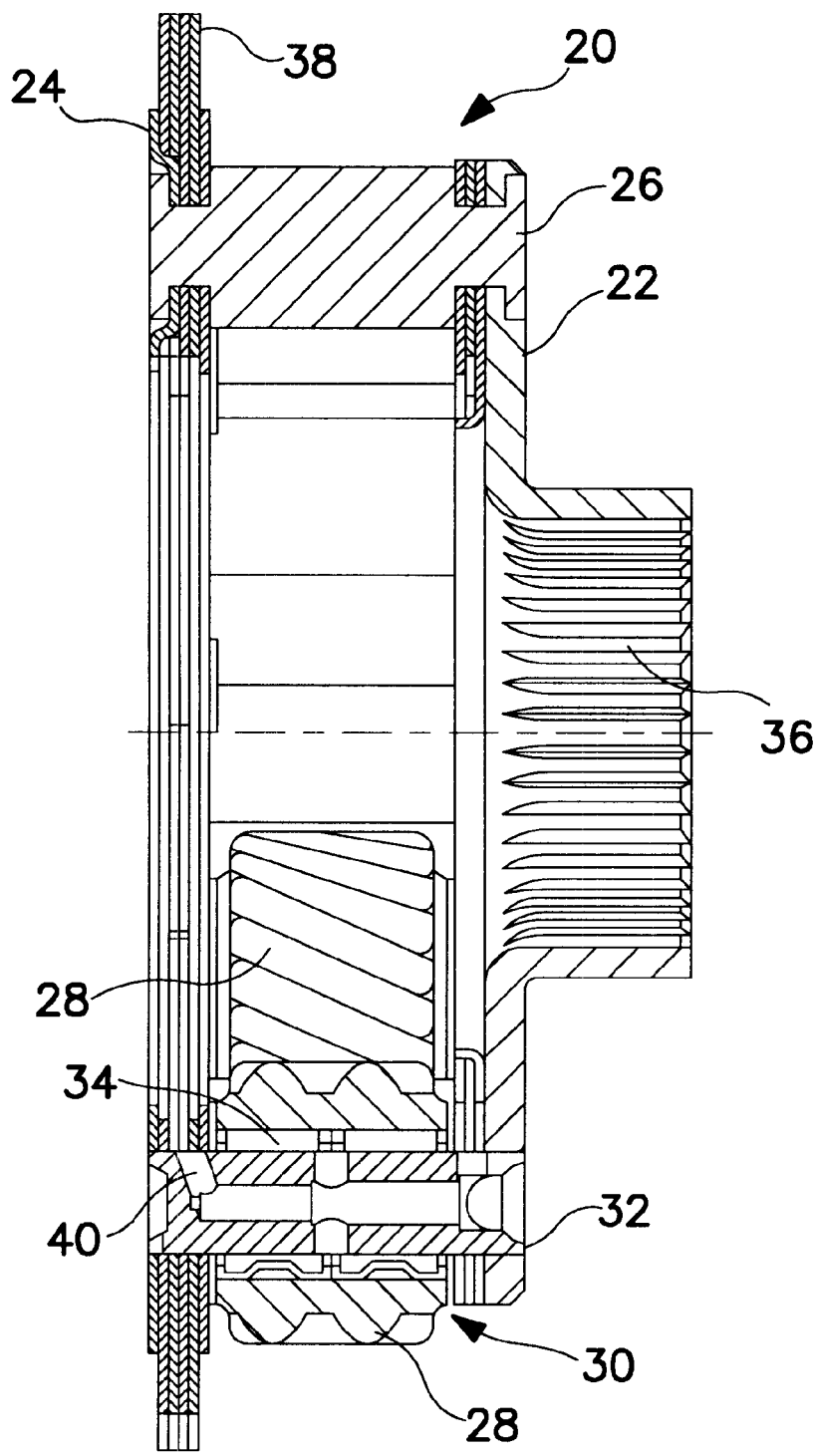
FIG. 3 is a sectional view of the carrier assembly of FIG. 2, as indicated by the line 3—3 of FIG. 2.

FIGS. 2 and 3 illustrate a carrier member 20 of the present invention comprising a first end plate 22, a second end plate 24, and rivets 26 joining the two end plates together. At least one end plate is formed as a laminated structure. In the illustration, this lamination is shown predominately with second end plate 24. Planetary gears 28 are mounted within windows 30 by planet shafts 32 and rollers 34 for free rotation about the planet shafts. End spline 36 and perimeter teeth 38 are typical of various applications. Planet shafts 32 are shown with lubricant passages 40 to the rollers 34 and to the layers of second plate 24.

Lubrication is typically supplied to the gears and bearings of the carrier assembly through a series of interconnected holes or channels. These passages are usually drilled or formed by secondary operations. However, in the laminated carrier assembly of the present invention, holes can be pierced in layers of the laminated structure during (and as part of) the initial stamping operation. Because the location of such holes in adjacent layers can be varied, an intricate network of interconnected passages can be created within the carrier member.

These interconnected passages can be designed to allow lubricant flow through the carrier member to parts of the carrier assembly where lubrication is most critical. Such designs can optimally control where lubricant enters and exits the carrier assembly. Holes in the layers of the laminated structure need not be round. The holes may be elongated slots or may be pierced into the layers in any shape such that they provide a network of passages suitable for the capture, retention and routing of lubricating oil or other fluids where needed in the planetary carrier assembly.

Figure 4:
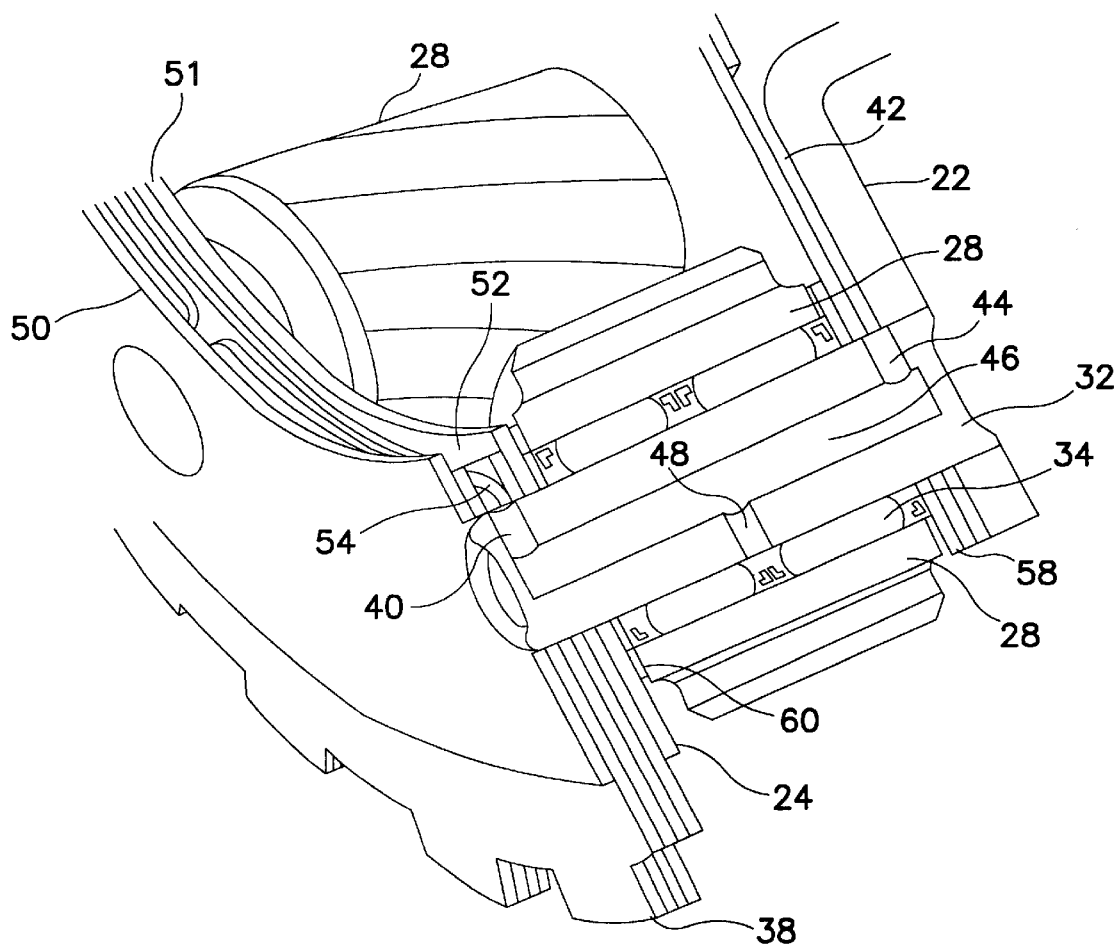
FIGS. 4, 5 and 6 are enlarged pictorial views of a carrier assembly, with portions cut away, illustrating further embodiments of the laminated carrier of the present invention.

This concept is shown in FIG. 4, where a slot 42 is formed by one of the laminates, which allows lubricant to flow radially outward. This slot 42 interconnects with a cross hole 44 in the planet shaft 32 which itself is interconnected to axial hole 46 and center cross hole 48 in the planet shaft to provide bearing lubrication. In another embodiment shown in FIG. 5, holes 56 are located in the laminate which channel lubricant from slot 42 to the surface between the planet gear 28 and the inboard laminate.

Because oil is slung by rotating members in a planetary application, there are, traditionally, features designed to catch and channel oil to specific areas of the gear set and carrier assembly. Through the use of suitably modified laminations, catching devices can be designed into the lamination, which would otherwise require separate add-on components. In FIG. 4, for example, the bore diameter of laminates 50 and 51 is such that, when the lamination is complete, a circumferential groove 52 is formed in the bore of the carrier rim. This groove traps slung lubricant and, through centrifugal force, channels lubricant into a lubricant slot 54 in the laminate and to the lubrication hole 40 in the planet shaft 32.

Different materials can be used to build up the lamination based on the carrier application and design. For example, a hardened steel laminate, may be used where the laminate is subject to abrasion or fatigue while other laminates in the carrier could be made of lower cost, unhardened steel. Other materials could be used, such as molded or pierced plastic, for example. Since modern analysis tools are available to evaluate the structural integrity of the carrier, the designer can optimize the carrier design through the geometry and properties of each laminate in the assembled lamination in order to meet the design requirements of the carrier and carrier assembly. The laminate designs can be optimized for structural fatigue strength, thermal stability and/or minimal distortion, as examples.

As an example, and as shown in FIG. 4, the planet gear 28 is shown to thrust directly against the inboard laminate 58 and 60. Due to the wear characteristics required, this laminate is hardened to reduce wear. The other laminates do not require this wear resistance and therefore do not need to be hardened. Thus, this concept requires only the specific laminates to be made of the more expensive materials to provide such properties.

Carrier assemblies benefit from low mass because low mass enhances the speed and acceleration of the gear set. The laminated concept permits mass reduction by the removal of material in laminates where it is not required for strength. For example, internal laminates may have holes pierced in them solely to reduce their mass but without loss of structural integrity as assembled into the lamination. Voids such as this within the structure would be difficult or impractical to produce by traditional methods of carrier manufacture.

Carrier assemblies also benefit from dampening of noise and vibration. The laminated construction of the present invention inherently provides such dampening. In addition, particular materials may be selected for the laminations to enhance this characteristic. Lead, bronze, copper, aluminum, various sintered metals, rubber, and polymers such as nylon and polyamides, for example, and voids may be used. Such laminations may be of various thicknesses and may be applied as a thin coating or film.

The laminated carrier of the present invention provides opportunities to integrate other design features into the carrier assembly. For example, planet shafts may be used which are stepped at their ends to provide a secure mechanical connection between these shaft step shoulders and the carrier faces. This construction feature adds to the structural rigidity of the carrier member.

Figure 5:
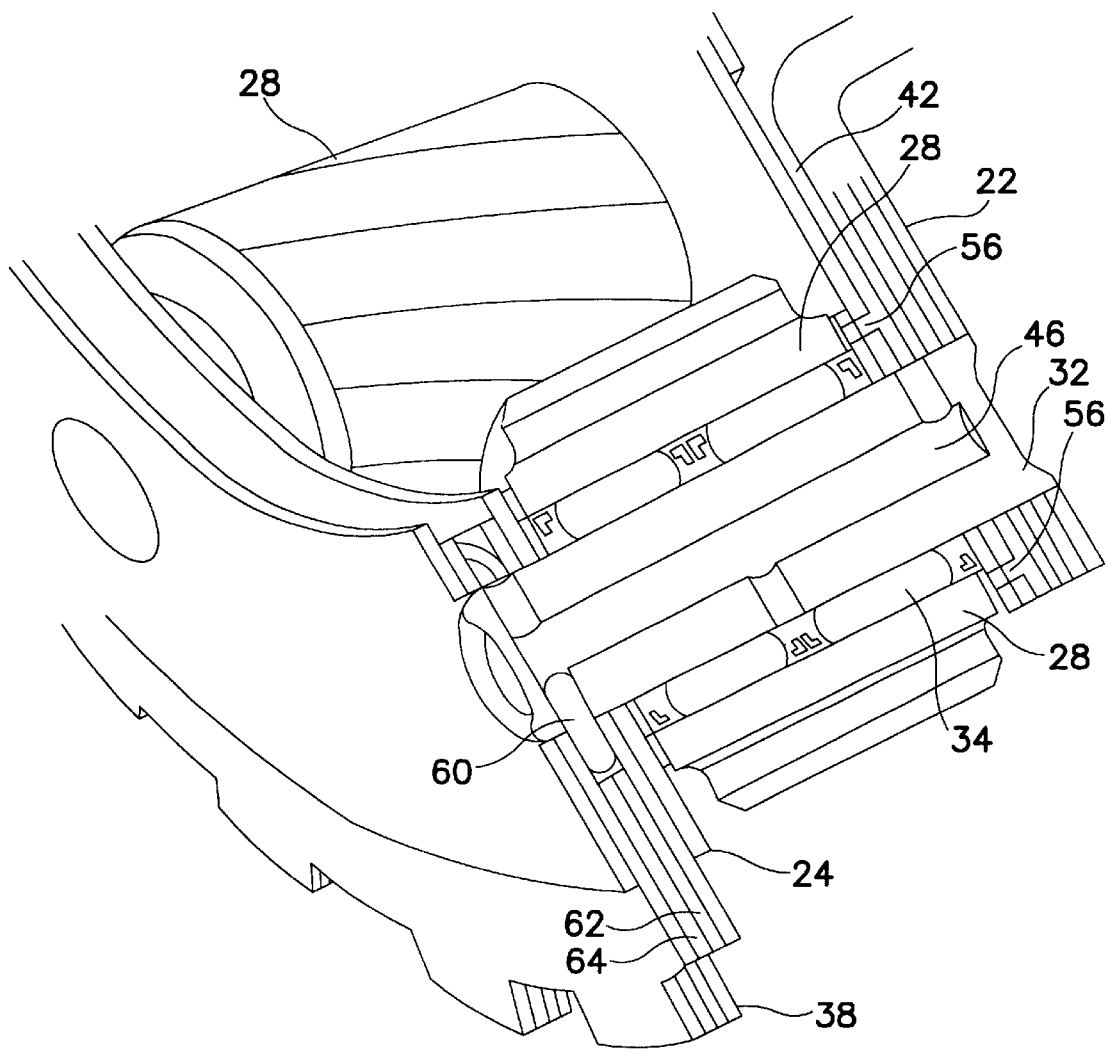

Often, the use of a protruding pin or other device on the planet shaft is used to provide a means to axially and circumferentially locate the planet shaft in the assembly. These pins usually engage a slot or other features in the carrier member. This feature can be used to guarantee that the shaft can only be assembled with the desired circumferential or axial orientation. In a laminated carrier, the slots required to receive the pin in such applications can easily be stamped in one of the layers of the lamination (and without secondary operation) such that it is correctly locates the pin. This is shown in FIG. 5. It can be seen that the laminate is relieved in the area where location pin 60 is mounted. This relief is formed by a slot in two adjacent laminates 62 and 64.

Figure 6:
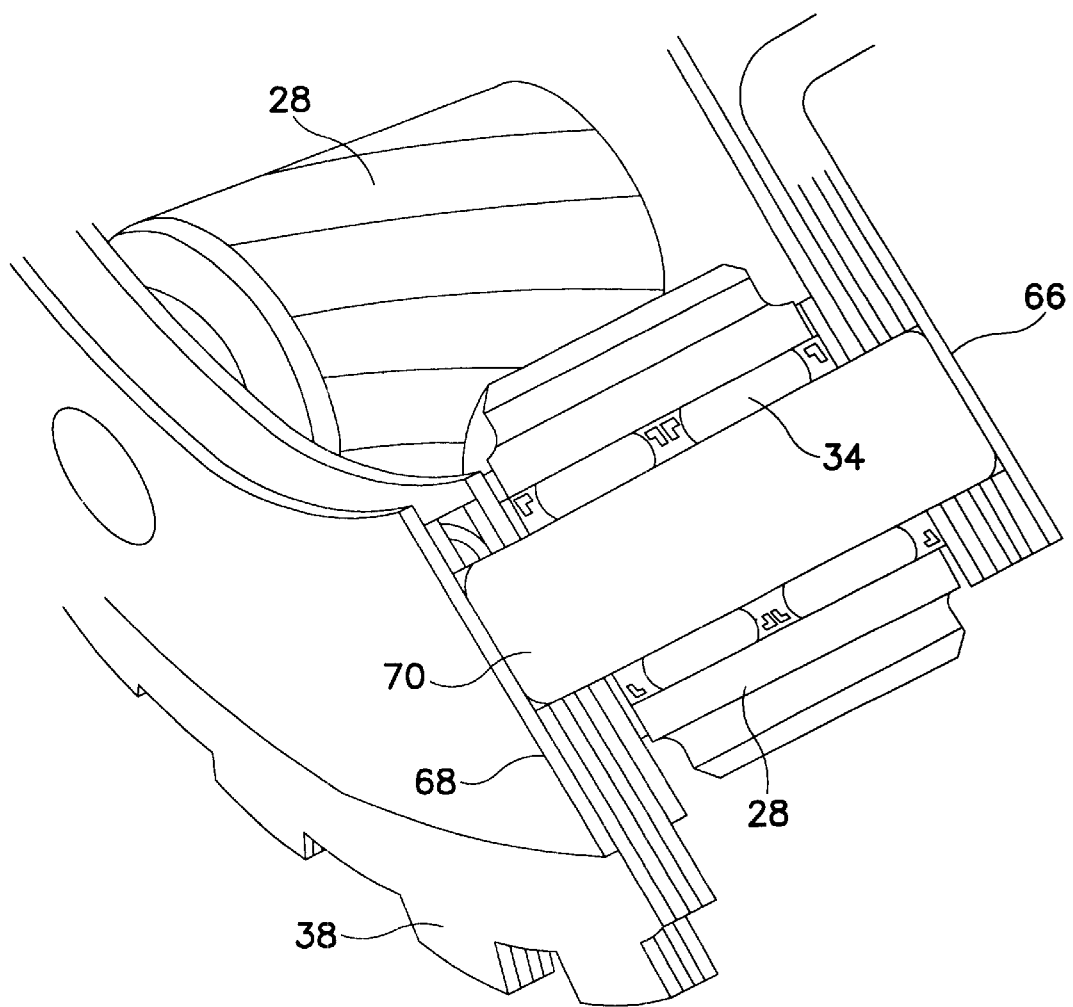

In an alternate design using the laminated carrier concept, end laminates 66 and 68 can be solid in the area of a planet shaft 70 to axially retain the planet shaft while allowing some degree of circumferential shaft movement. This movement can provide increased fatigue resistance of the shaft and subsequently, longer fatigue life. This concept is shown in FIG. 6.

Figure 7:
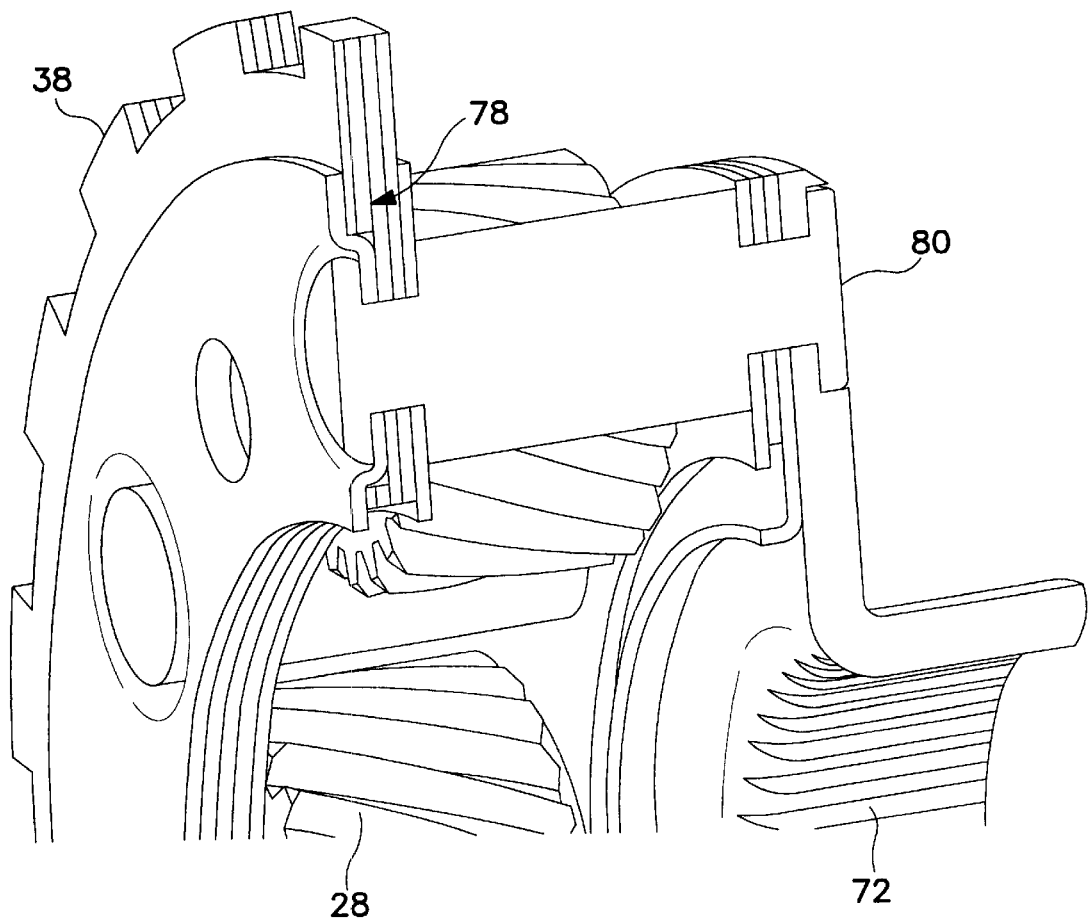
FIGS. 7 and 8 are enlarged pictorial views of a carrier assembly, with portions cut away, illustrating embodiments of the present invention incorporating additional components.
Figure 8:
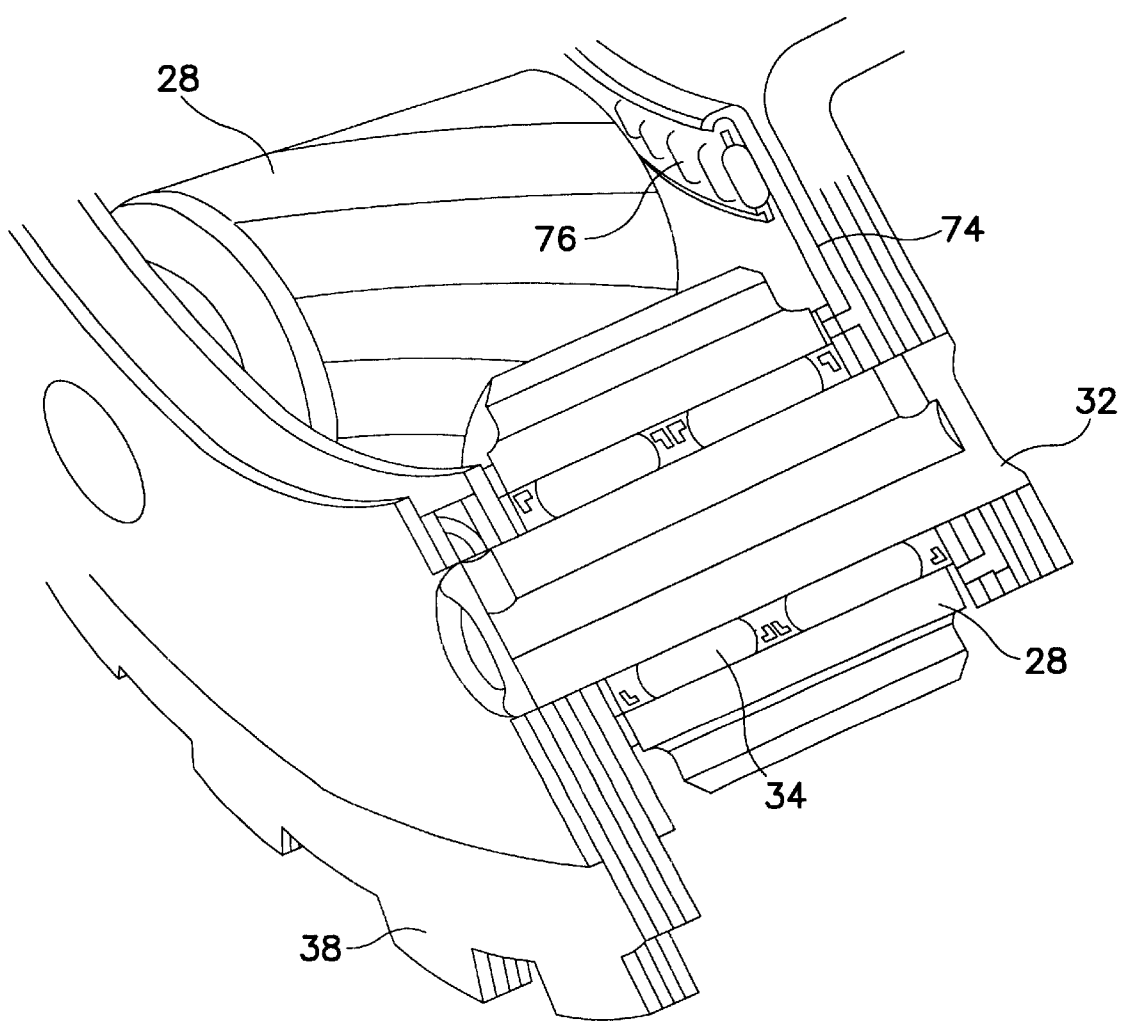

The laminated design allows the incorporation of members, which traditionally have been added to the carrier assembly in subsequent assembly operations. These members, such as splined plates or bearing seats can become part of the lamination reducing subassembly and manufacturing cost. The laminated concept does not restrict the selection of materials, shapes or finish of the added member. An example of this is shown in FIG. 7, where a splined flange 72 is incorporated as a composite part of the lamination. Another example is shown in FIG. 8, where a laminate extension 74 is formed of bearing steel to contain a thrust bearing 76. This laminate is designed to both support the bearing and retain it for piloting and assembly purposes.

The integrity of the lamination can be enhanced by the use of depressed or raised shapes in certain laminations, which engage corresponding voids in adjacent laminations. This will provide a means to structurally lock the laminations together to ensure correct orientation of the individual laminates and to resist loads and deflections. Also, the use of brazing foils or other methods can provide a means of locking laminations together in such a manner as to aid assembly and increase the strength of the carrier member.

The laminate assembly may be joined and maintained together by any means such as staking, bonding, riveting or welding. Specialized welding techniques, such as electron beam welding, for example, may be used to weld many layers of laminate to spacers of various shapes to provide the windows of the laminated carrier. The configuration of the laminates can be such as to accommodate the assembling method. For instance, by recessing laminates 78 shown in FIG. 7, a rivet 80 (which is used to maintain the assembly in this case) can be kept flush (or below) with respect to the side face surface of the carrier assembly.

Having described the invention, what is claimed is:

1. A laminated carrier for a planetary gear set, the laminated carrier comprising:
   a first end plate;
   a second end plate; and
   connecting means joining the first and second end plates together such that windows are formed therebetween for locating planetary gears;
   wherein at least one of the first and second end plates comprises multiple layers of material joined together, such that a non-uniform internal structure is formed and wherein the multiple layers of material provide recesses to receive planet shafts and end laminates that are solid in an area overlying said recesses to retain the planet shafts and allow some degree of circumferential shaft movement.

2. The laminated carrier according to claim 1, wherein the non-uniform internal structure comprises at least one layer of a different material.

3. The laminated carrier according to claim 1, wherein the non-uniform internal structure comprises at least one layer of a different hardness.

4. The laminated carrier according to claim 1, wherein the non-uniform internal structure comprises at least one layer having voids.

5. The laminated carrier according to claim 1, wherein the non-uniform internal structure includes at least one void that provides a path for lubricant.

6. The laminated carrier according to claim 1, wherein the non-uniform internal structure includes at least two layers having voids that interconnect to provide a path for lubricant.

7. The laminated carrier according to claim 1, wherein the non-uniform internal structure includes at least one layer that is pierced to form elongated slots.

8. The laminated carrier according to claim 1, wherein the multiple layers of material provide stepped recesses to receive stepped planet shafts.

9. The laminated carrier according to claim 1, wherein the multiple layers of material provide a recess to receive a locating pin protruding from a planet shaft.

10. The laminated carrier according to claim 1, wherein the multiple layers of material include recessed and raised shapes such that a structural interlock is provided between adjacent layers.

11. The laminated carrier according to claim 1, wherein the multiple layers of material are joined together by staking.

12. The laminated carrier according to claim 1, wherein the multiple layers of material are joined together by riveting.

13. The laminated carrier according to claim 1, wherein the multiple layers of material are joined together by bonding.

14. The laminated carrier according to claim 1, wherein the multiple layers of material are joined together by welding.

15. A laminated carrier for a planetary gear set, the laminated carrier comprising:

a first end plate;

a second end plate; and connecting means joining the first and second end plates together such that windows are formed therebetween for locating planetary gears;

wherein at least one of the first and second end plates comprises multiple layers of material joined together, such that a non-uniform internal structure is formed and wherein the multiple layers of material are, generally, in the shape of flat rings, and have bore diameters such that a circumferential groove is formed in the bore of the laminated carrier to provide a channel for lubricant.

16. A laminated carrier for a planetary gear set, the laminated carrier comprising:

a first end plate;

a second end plate; and connecting means joining the first and second end plates together such that windows are formed therebetween for locating planetary gears;

wherein at least one of the first and second end plates comprises multiple layers of material joined together, such that a non-uniform internal structure is formed and wherein the multiple layers of material are joined by rivets and wherein the multiple layers are configured to allow ends of the rivets to be recessed.

* * * * *